United States Patent
Zhu et al.

(10) Patent No.: US 9,985,318 B2
(45) Date of Patent: May 29, 2018

(54) ELECTROLYTE FORMULATIONS

(71) Applicant: Wildcat Discovery Technologies, Inc., San Diego, CA (US)

(72) Inventors: Ye Zhu, San Diego, CA (US); Deidre Strand, San Diego, CA (US); Gang Cheng, San Diego, CA (US)

(73) Assignee: WILDCAT DISCOVERY TECHNOLOGIES, INC, San Diego, CA (US)

( * ) Notice: Subject to any disclaimer, the term of this patent is extended or adjusted under 35 U.S.C. 154(b) by 0 days. days.

(21) Appl. No.: 15/188,905

(22) Filed: Jun. 21, 2016

(65) Prior Publication Data
US 2016/0372792 A1    Dec. 22, 2016

Related U.S. Application Data

(60) Provisional application No. 62/183,118, filed on Jun. 22, 2015.

(51) Int. Cl.
*H01M 10/0569* (2010.01)
*H01M 4/134* (2010.01)
*H01M 4/38* (2006.01)
*H01M 10/0525* (2010.01)
*H01M 10/0568* (2010.01)
*H01M 10/052* (2010.01)
*H01M 4/02* (2006.01)
*H01M 10/0567* (2010.01)

(52) U.S. Cl.
CPC ....... *H01M 10/0569* (2013.01); *H01M 4/134* (2013.01); *H01M 4/386* (2013.01); *H01M 10/052* (2013.01); *H01M 10/0525* (2013.01); *H01M 10/0568* (2013.01); *H01M 10/0567* (2013.01); *H01M 2004/027* (2013.01); *H01M 2300/0028* (2013.01)

(58) Field of Classification Search
CPC .. H01M 10/0569; H01M 4/134; H01M 4/386; H01M 10/0568; H01M 10/0525; H01M 2004/027
See application file for complete search history.

(56) References Cited

U.S. PATENT DOCUMENTS

| | | |
|---|---|---|
| 6,403,256 B1 | 6/2002 | Gan et al. |
| 2011/0151337 A1 | 6/2011 | Kim et al. |
| 2014/0234727 A1 | 8/2014 | Abe et al. |
| 2014/0377643 A1 | 12/2014 | Lee et al. |
| 2015/0056514 A1 | 2/2015 | Dai et al. |
| 2016/0248121 A1* | 8/2016 | Uematsu ............ H01M 4/5825 |
| 2016/0351902 A1* | 12/2016 | Hamanaka ............ H01M 4/131 |

FOREIGN PATENT DOCUMENTS

JP    5709231 B1 *    4/2015    ............ H01M 4/131

* cited by examiner

*Primary Examiner* — Stewart A Fraser
(74) *Attorney, Agent, or Firm* — Corridor Law Group, P.C.

(57) ABSTRACT

An electrochemical cell including a silicon-based anode and an electrolyte, where the electrolyte is formulated to contain solvents having cyclic sulfone or cyclic sulfite chemical structure. Specific additional solvent and salt combinations yield superior performance in these electrochemical cells.

41 Claims, 2 Drawing Sheets

ELECTROLYTE FORMULATIONS

CROSS-REFERENCE TO RELATED APPLICATIONS

This application claims priority to U.S. Provisional Application No. 62/183,118 filed Jun. 22, 2015 entitled "Electrolyte Formulations." This application claims priority to and the benefit of this application, and such application is incorporated herein by reference in its entirety.

STATEMENT REGARDING FEDERALLY SPONSORED RESEARCH OR DEVELOPMENT

This invention was made with government support under DOE EE0006453 awarded by the Department of Energy. The government has certain rights in the invention.

BACKGROUND OF THE INVENTION

The present invention is in the field of battery technology and, more particularly, electrolyte formulations that address challenges encountered during the use of silicon anodes in lithium ion batteries.

Lithium ion batteries enjoy relatively widespread use, but research continues into improving the energy density, capacity, and cycle life of these batteries. For example, silicon has been used as an anode material to improve the energy density of lithium ion cells. Silicon anodes can provide high energy density to lithium ion batteries due to the high theoretical capacity of silicon, which is 4200 mAh/g. However, the silicon particles that make up the anode can undergo larges changes in their volume during battery cycling. The volumetric changes on lithiation and delithiation cycles can be as large as about 300%

These large volumetric changes in the silicon anode material can have negative effects on battery cycle life. A number of mechanisms may contribute to poor cycle life. For example, silicon particles can fracture due to the large stresses in the material brought on by the large changes in volume during cycling. These fractures can result in electrically isolated particle fragments that can no longer contribute to the capacity during cycling. Even when silicon particles do not completely fracture, the large stresses in the anode material can result in cracks in the particle and delamination of the particle surface. These cracks and delaminations can result in portions of the active material being electrically isolated and unable to contribute to the capacity during cycling.

As another example of a failure mechanism, the solid-electrolyte interphase (SEI) that forms on the surface of silicon anode particles tends to not be mechanically robust. The result is cracking and delamination of this thin SEI layer on the particles as the large volume changes occur. Therefore, more SEI must be formed on each cycle to replace the cracked or delaminated SEI. But, this is not ideal because forming SEI irreversibly consumes battery capacity and creates gas products. Generally, a stable SEI should be formed on the initial cycles and should not need to be reformed.

Thus, there exists a need for an electrolyte formulation for silicon anodes in a lithium ion battery that improves cycle life by forming a more mechanically robust SEI. These and other challenges can be addressed by certain embodiments of the invention described herein.

BRIEF SUMMARY OF THE INVENTION

Embodiments of the present invention are solvents and solvent blends for electrolyte formulations that enable the formation of comparatively more robust SEI films on silicon anodes. The SEI films in these embodiments are seen to be more robust in part because the batteries containing these materials have higher coulombic efficiency and longer cycle life than comparable batteries without such solvent blends.

Embodiments of the present invention include the methods of making such electrolyte formulations using the solvents and solvent blends disclosed herein, the methods of assembling batteries including such electrolytes using the solvents and solvent blends disclosed herein, and using batteries including such electrolytes using the solvents and solvent blends disclosed herein.

DETAILED DESCRIPTION OF THE INVENTION

Figure 1:
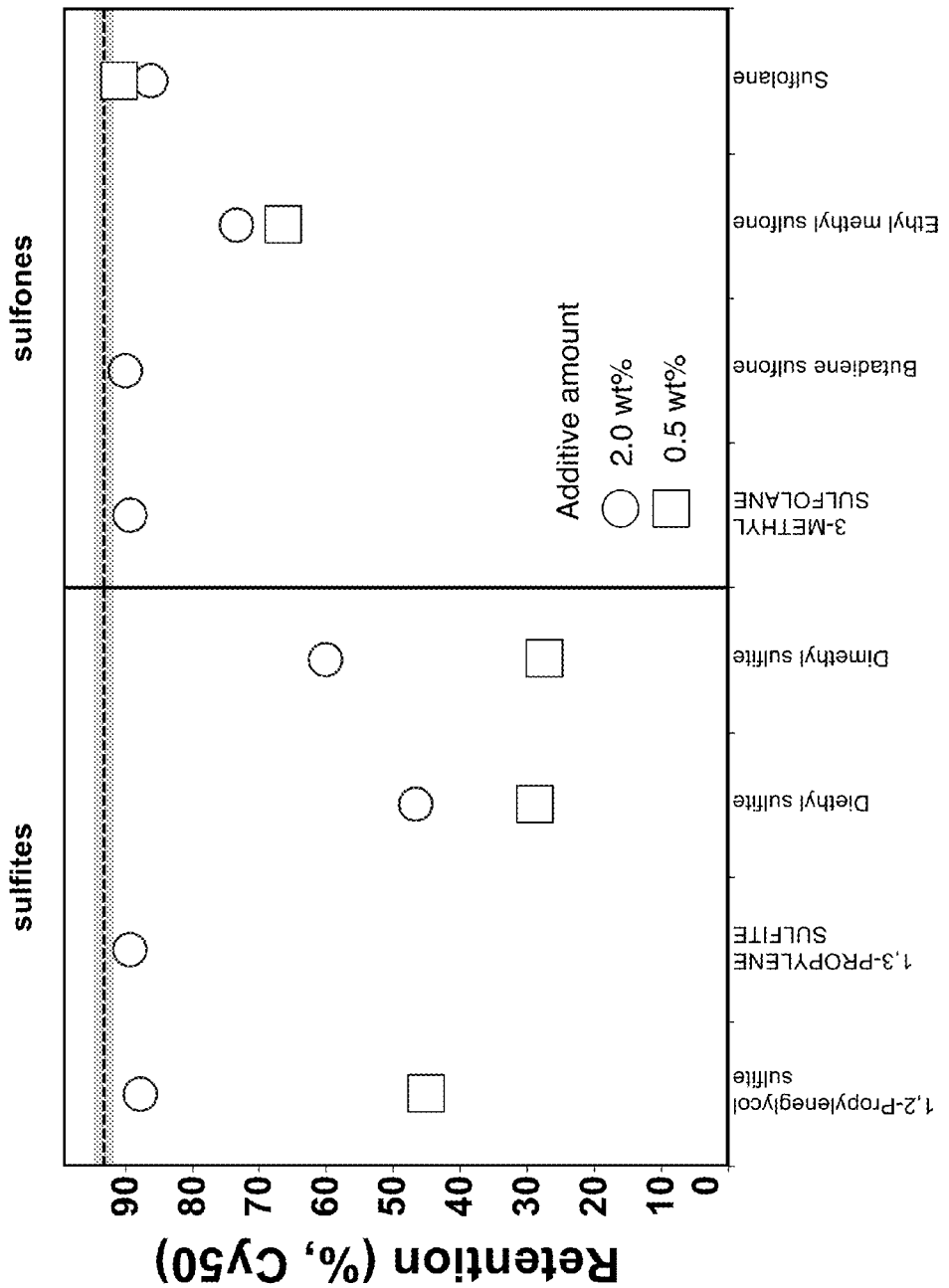
FIG. 1 illustrates the results of capacity retention testing of various sulfone-based and sulfite-based formulations as compared to a control formulation.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

Ranges presented herein are inclusive of their endpoints. Thus, for example, the range 1 to 3 includes the values 1 and 3 as well as the intermediate values.

In some embodiments disclosed herein, electrolyte solutions formulated to contain specific solvents and solvent blends types can improve energy density, capacity, and cycle life of these batteries.

Silicon-containing anodes can provide a higher energy density than carbon-based anodes. While the theoretical capacity of a silicon anode is on the order of 4200 mAh/g, it is necessary to balance the high capacity of a silicon anode with the undesirable properties that a silicon anode can have. For example, a silicon anode can have relatively high changes in volume during a charge/discharge cycle. The volumetric changes in a silicon anode can be from 70% to 300% over the range of desired anode. That is, for an anode where only a small portion of the silicon capacity is utilized, the silicon may experience a volumetric change on the order of about 70%. In contrast, for an anode where a comparatively high portion of the silicon capacity is utilized, the silicon may experience a volumetric change on the order of about 300%. In certain embodiments disclosed herein, silicon anodes with capacities in the range of about 600 mAh/g to about 1200 mAh/g are matched with cathode materials having a similar capacity to yield a battery that demonstrates stable cycle life in the presence of an electrolyte containing additives discloses herein. The solvents and solvent blends disclosed herein provide an unexpected improvement in the capacity fade during cycling compared to the baseline formulations without such solvents and solvent blends in batteries containing a silicon-based anode.

Known batteries containing silicon anodes experience limited cycle life and poor coulombic efficiency. The deficiencies of known batteries containing silicon-based anode can be due to a loss of connectivity in the anode of the active silicon material. The loss of connectivity can be due to structural defects in the anode related to the large change in volume experienced by the anode. The large volumetric changes can result in cracking and/or delamination of the electrode. Also, the large volumetric changes may be related to an unstable or ineffective SEI on the active silicon electrode. Further, the SEI formed from the ethylene carbonate component of the electrolyte on a silicon anode may also be unstable or ineffective regardless of the volumetric changes experiences by a silicon-based anode. Certain solvents and solvent blends can improve the mechanical stability of the SEI formed. The solvents and solvent blends disclosed herein provide surprising improvements to the performance of batteries containing silicon-based anodes.

The solvents and solvent blends disclosed herein yield an electrolyte solution that provides an electrochemically and mechanically stable SEI. The solvents and solvent blends disclosed herein yield an electrolyte solution that enables the silicon anode to withstand the relatively large volumetric expansions and contractions known to occur in silicon-based anodes. These solvents and solvent blends enable both the anode and cathode to be chemically, electrochemically, and mechanically stable through multiple battery cycles.

The solvents and solvent blends disclosed in electrolyte formulations described herein are capable of enabling the formation of stable SEI. The solvents and solvent blends disclosed herein can yield a stable SEI on a silicon-based anode when used in electrolyte formulations instead of ethylene carbonate (EC).

Electrolyte formulations used in lithium ion batteries generally consist of at least two solvent types: a high dielectric constant (HD) solvent and a low viscosity solvent (LV). The high dielectric constant solvent is used to solvate the lithium ions that are conducted through the electrolyte. High dielectric constant solvents tend to have comparatively high viscosities and/or high melting points, which can be detrimental to low temperature performance. High dielectric constant solvents as described herein are solvents that have a dielectric constant of greater than about 40 at room temperature and are otherwise suitable for use in a lithium ion battery. Ethylene carbonate is an example of a commonly used high dielectric constant solvent.

Thus, low viscosity solvents are added to the electrolyte formulation to ensure adequate diffusion of the solvated lithium ions. However, low viscosity solvents often have comparatively lower thermal stability (they may have a relatively low boiling point, for example) and can compromise the high temperature stability of the electrolyte formulation. Low viscosity solvents as described herein are solvents that have a viscosity of less than about 1.0 cP at room temperature and are otherwise suitable for use in a lithium ion battery with respect to properties such as electrochemical stability. Low viscosity solvents include ethyl methyl carbonate (EMC), diethyl carbonate (DEC), dimethyl carbonate (DMC), dipropyl carbonate (DPC), methyl butyrate (MB), methyl acetate (MA) methyl propionate (MP), isobutyl acetate (IA), methyl trimethyl acetate (MTA), and methyl isovalerate (MI).

According to certain embodiments of the invention, electrolyte formulations include solvents having cyclic sulfone or cyclic sulfite chemical structure. In some embodiments, the cyclic sulfone or cyclic sulfite based solvents are used to replace ethylene carbonate, which is a conventional solvent for electrolyte formulations. Advantageously, electrolyte formulations including solvents having cyclic sulfone or cyclic sulfite chemical structure improve the coulombic efficiency and capacity retention on cycling of batteries containing such electrolyte formulations as compared to batteries containing conventional electrolyte formulations.

In preferred embodiments, lithium ion full cells containing $LiNi_{0.4}Mn_{0.4}Co_{0.2}O_2$ (NMC) cathodes and silicon alloy anodes demonstrated improved performance when using electrolyte formulations including solvents having cyclic sulfone or cyclic sulfite chemical structure. Specifically, the solvents of certain embodiments of the invention improve cycle life in lithium ion full cells containing NMC cathodes and silicon alloy anodes.

In some embodiments, the electrolyte formulations contain cyclic sulfone or cyclic sulfite based solvents rather than ethylene carbonate. In such embodiments, various low viscosity solvents or additives can be present to provide other improved performance characteristics, such as low temperature power performance, high temperature stability and high voltage cycling performance.

As used herein, sulfones can be represented by generic formula (1):

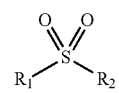

(1)

where $R_1$ and $R_2$ are independently selected from the group consisting of hydrogen, substituted and unsubstituted $C_1$-$C_{20}$ alkyl groups, substituted and unsubstituted $C_1$-$C_{20}$ alkenyl groups, substituted and unsubstituted $C_1$-$C_{20}$ alkynyl groups, substituted and unsubstituted $C_5$-$C_{20}$ aryl groups, hydride groups, halo groups, hydroxy groups, thio groups, alkyl groups, alkenyl groups, alkynyl groups, aryl groups, iminyl groups, alkoxy groups, alkenoxy groups, alkynoxy groups, aryloxy groups, carboxy groups, alkylcarbonyloxy groups, alkenylcarbonyloxy groups, alkynylcarbonyloxy groups, arylcarbonyloxy groups, alkylthio groups, alkenylthio groups, alkynylthio groups, arylthio groups, cyano groups, N-substituted amino groups, alkylcarbonylamino groups, N-substituted alkylcarbonylamino groups, alkenylcarbonylamino groups, N-substituted alkenyl carbonylamino groups, alkynylcarbonyl amino groups, N-substituted alkynylcarbonylamino groups, arylcarbonylamino groups, N-substituted arylcarbonylamino groups, boron-containing groups, aluminum-containing groups, silicon-containing groups, phosphorus-containing groups, and sulfur-containing groups.

In some preferred embodiments, the sulfone is cyclic and can be represented by generic formula (1A):

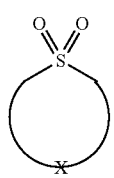

(1A)

where X is a substituted or unsubstituted $C_3$-$C_{20}$ aryl groups, where the substitutions can include hydride groups, halo groups, hydroxy groups, thio groups, alkyl groups, alkenyl groups, alkynyl groups, aryl groups, iminyl groups, alkoxy groups, alkenoxy groups, alkynoxy groups, aryloxy groups, carboxy groups, alkylcarbonyloxy groups, alkenylcarbonyloxy groups, alkynylcarbonyloxy groups, arylcarbonyloxy groups, alkylthio groups, alkenylthio groups, alkynylthio groups, arylthio groups, cyano groups, N-substituted amino groups, alkylcarbonylamino groups, N-substituted alkylcarbonylamino groups, alkenylcarbonylamino groups, N-substituted alkenyl carbonylamino groups, alkynylcarbonyl amino groups, N-substituted alkynylcarbonylamino groups, arylcarbonylamino groups, N-substituted arylcarbonylamino groups, boron-containing groups, aluminum-containing groups, silicon-containing groups, phosphorus-containing groups, and sulfur-containing groups.

As used herein, sulfites can be represented by generic formula (2):

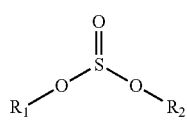

(2)

where $R_1$ and $R_2$ are independently selected from the group consisting of hydrogen, substituted and unsubstituted $C_1$-$C_{20}$ alkyl groups, substituted and unsubstituted $C_1$-$C_{20}$ alkenyl groups, substituted and unsubstituted $C_1$-$C_{20}$ alkynyl groups, substituted and unsubstituted $C_5$-$C_{20}$ aryl groups, hydride groups, halo groups, hydroxy groups, thio groups, alkyl groups, alkenyl groups, alkynyl groups, aryl groups, iminyl groups, alkoxy groups, alkenoxy groups, alkynoxy groups, aryloxy groups, carboxy groups, alkylcarbonyloxy groups, alkenylcarbonyloxy groups, alkynylcarbonyloxy groups, arylcarbonyloxy groups, alkylthio groups, alkenylthio groups, alkynylthio groups, arylthio groups, cyano groups, N-substituted amino groups, alkylcarbonylamino groups, N-substituted alkylcarbonylamino groups, alkenylcarbonylamino groups, N-substituted alkenyl carbonylamino groups, alkynylcarbonyl amino groups, N-substituted alkynylcarbonylamino groups, arylcarbonylamino groups, N-substituted arylcarbonylamino groups, boron-containing groups, aluminum-containing groups, silicon-containing groups, phosphorus-containing groups, and sulfur-containing groups.

In some preferred embodiments, the sulfite is cyclic and can be represented by generic formula (2A):

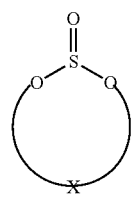

(2A)

where X is a substituted or unsubstituted $C_3$-$C_{20}$ aryl groups, where the substitutions can include hydride groups, halo groups, hydroxy groups, thio groups, alkyl groups, alkenyl groups, alkynyl groups, aryl groups, iminyl groups, alkoxy groups, alkenoxy groups, alkynoxy groups, aryloxy groups, carboxy groups, alkylcarbonyloxy groups, alkenylcarbonyloxy groups, alkynylcarbonyloxy groups, arylcarbonyloxy groups, alkylthio groups, alkenylthio groups, alkynylthio groups, arylthio groups, cyano groups, N-substituted amino groups, alkylcarbonylamino groups, N-substituted alkylcarbonylamino groups, alkenylcarbonylamino groups, N-substituted alkenyl carbonylamino groups, alkynylcarbonyl amino groups, N-substituted alkynylcarbonylamino groups, arylcarbonyl amino groups, N-substituted arylcarbonylamino groups, boron-containing groups, aluminum-containing groups, silicon-containing groups, phosphorus-containing groups, and sulfur-containing groups.

Preferred embodiments of solvents having sulfur-containing chemical structure include: butadiene sulfone (structure (a)); sulfolane (structure (b)); 3-methyl sulfolane (structure (c)); ethylene sulfite (structure (d)); 1,3-propylene sulfite (structure (e)); 1,2-propylene glycol sulfite (structure (f)); diethyl sulfite (structure (g)); dimethyl sulfite (structure (h)); and ethyl methyl sulfone (structure (i)).

(a)

(b)

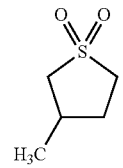

(c)

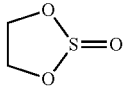

(d)

-continued

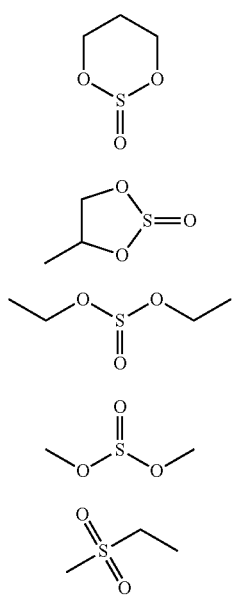

Particularly preferred embodiments of solvents having sulfur-containing chemical structure include: butadiene sulfone; sulfolane; 3-methyl sulfolane; ethylene sulfite; 1,3-propylene sulfite; and 1,2-propylene glycol sulfite. Unexpectedly, the solvents with cyclic sulfur-containing structures provided superior performance as compared to solvents with linear sulfur-containing structures.

Further, the solvents with cyclic sulfur-containing structures provide unexpected synergies when combined with particular low viscosity solvent and particular salts. That is, the electrochemical performance of a silicon anode cell can be further improved by combining a solvent with a cyclic sulfur-containing structure and a particular choice of low viscosity solvent and particular salts.

Methods

Battery Cell Assembly. Battery cells were assembled in a high purity argon filled glove box (M-Braun, $O_2$ and humidity content <0.1 ppm). A $LiNi_{0.4}Mn_{0.4}Co_{0.2}O_2$ (NMC) cathode electrode and a silicon alloy/graphite anode electrode were used. Each battery cell includes a cathode film, a polypropylene separator, and composite anode film. Electrolyte components were formulated and added to the battery cell.

Electrolyte Formulations. Electrolyte formulations used as controls were made from one or more organic solvents and a lithium salt. Organic solvents ethylene carbonate (EC) and ethyl methyl carbonate (EMC) were blended at a 1:2 ratio, by volume, of EC:EMC. The lithium salt was $LiPF_6$ at a concentration of 1M. In some embodiments, the lithium salt included lithium bis(oxalato)borate ("LiBOB"). Tested electrolyte formulations were prepared according to the ratios described below.

SEI Formation. Solid-electrolyte interphase (SEI) is formed during a formation cycle. For the cells tested herein, the formation cycle was 12 hours open circuit voltage (OCV) hold, followed by a C/10 charge to 4.2 V with a constant voltage (CV) hold to C/20, and then a C/10 discharge to 2.8 V. Cycling was repeated to ensure the complete SEI formation.

Electrochemical Testing. For capacity retention testing, cycling was continued at C/5 charge to 4.2 V with a CV hold to C/20 followed by a C/5 discharge to 2.8 V. All results are averages of two cells.

Results

Table 1 provides the capacity retention measured at the 50th cycle for batteries using various solvents having either cyclic sulfone or cyclic sulfite structure. Each of the solvents is a high dielectric constant (HD) solvent formulated with ethyl methyl carbonate (EMC) at 3:7 or 1:3 by volume. The control formulation contained EC:EMC at a 1:2 ratio. All formulations included 1M $LiPF_6$ and the additive fluoroethylene carbonate (FEC), added at 0.5 weight percent or 2.0 weight percent as indicated in Table 1.

TABLE 1

Capacity retention of various electrolyte formulations

| FEC Amount (wt %) | HD Solvent | HD Solvent Category | Structure | Avg. Cy 50 Capacity Retention (%) |
|---|---|---|---|---|
| 0.5 | Sulfolane | sulfones | cyclic | 90.7 |
| 2.0 | Butadiene sulfone | sulfones | cyclic | 90.0 |
| 2.0 | 3-Methyl sulfolane | sulfones | cyclic | 89.4 |
| 2.0 | 1,3-Propylene sulfite | sulfites | cyclic | 89.4 |
| 2.0 | 1,2-Propyleneglycol sulfite | sulfites | cyclic | 87.8 |
| 2.0 | Sulfolane | sulfones | cyclic | 86.2 |
| 2.0 | Ethyl methyl sulfone | sulfones | linear | 73.5 |
| 0.5 | Ethyl methyl sulfone | sulfones | linear | 66.5 |
| 2.0 | Dimethyl sulfite | sulfites | linear | 60.1 |
| 2.0 | Diethyl sulfite | sulfites | linear | 46.7 |
| 0.5 | 1,2-Propyleneglycol sulfite | sulfites | cyclic | 45.1 |
| 0.5 | Diethyl sulfite | sulfites | linear | 28.9 |
| 0.5 | Dimethyl sulfite | sulfites | linear | 27.6 |

As a class, the cyclic sulfone based solvents perform well with the additive fluoroethylene carbonate, with results approaching that of the ethylene carbonate-containing control. In addition, cyclic sulfite based solvents performed similar to the control in presence of the additive fluoroethylene carbonate.

Table 2 presents electrochemical performance measured for a variety of formulations containing the solvents disclosed herein. Table 2 classifies the solvents as high dielectric constant (HD) or low viscosity (LV). The control formulation uses ethylene carbonate (EC) as the HD solvent and ethyl methyl carbonate (EMC) as the LV solvent. In the control formulation, the ratio of HD:LV is 1:2 by volume with no additive. In the other formulations, the ratio of HD:LV is 1:3 by volume. All formulations contained 1M $LiPF_6$ and 2% by weight fluorinated ethylene carbonate (FEC) as an additive.

TABLE 2

$1^{st}$ cycle capacity, $1^{st}$ cycle CE and $100^{th}$ cycle capacity retention for certain formulations

| HD Solvent | LV Solvent | 1st Cycle Capacity (mAh/g) | 1st Cycle CE (%) | Capacity Retention (Cycle 100, %) |
|---|---|---|---|---|
| EC | EMC | 131.5 | 82.3 | 83.4 |
| 1,2-propylene glycol sulfite | DEC | 129.6 | 81.5 | 80.8 |
| 1,2-propylene glycol sulfite | DMC | 126.6 | 79.2 | 51.0 |

TABLE 2-continued

1st cycle capacity, 1st cycle CE and 100th cycle capacity retention for certain formulations

| HD Solvent | LV Solvent | 1st Cycle Capacity (mAh/g) | 1st Cycle CE (%) | Capacity Retention (Cycle 100, %) |
|---|---|---|---|---|
| 1,2-propylene glycol sulfite | DPC | 125.0 | 79.5 | 73.4 |
| 1,2-propylene glycol sulfite | EMC | 126.4 | 81.0 | 75.7 |
| 1,2-propylene glycol sulfite | MB | 129.0 | 81.6 | 68.5 |
| 1,3-propylene sulfite | DEC | 131.3 | 82.2 | 84.5 |
| 1,3-propylene sulfite | DMC | 123.5 | 80.6 | 84.1 |
| 1,3-propylene sulfite | DPC | 124.3 | 80.2 | 83.3 |
| 1,3-propylene sulfite | EMC | 129.1 | 82.2 | 84.1 |
| 1,3-propylene sulfite | MB | 130.3 | 82.1 | 84.0 |
| butadiene sulfone | DEC | 130.7 | 82.2 | 84.6 |
| butadiene sulfone | DMC | 129.4 | 81.0 | 84.1 |
| butadiene sulfone | EMC | 129.6 | 81.3 | 84.9 |
| butadiene sulfone | MA | 126.4 | 79.9 | 60.0 |
| butadiene sulfone | MB | 125.9 | 81.0 | 81.1 |
| sulfolane | DEC | 123.2 | 81.0 | 81.3 |
| sulfolane | EMC | 124.6 | 79.1 | 86.9 |
| sulfolane | MA | 123.6 | 78.7 | 83.4 |
| sulfolane | MB | 115.6 | 76.0 | 79.5 |

Table 2 presents the first cycle capacity, first cycle coulombic efficiency (CE) and capacity retention at the 100th cycle. Notable formulations include: 1,3-propylene sulfite/diethyl carbonate; 1,3-propylene sulfite/dimethyl carbonate; 1,3-propylene sulfite/ethyl methyl carbonate; 1,3-propylene sulfite/methyl butyrate; butadiene sulfone/diethyl carbonate; butadiene sulfone/dimethyl carbonate; butadiene sulfone/ethyl methyl carbonate; and sulfolane/ethyl methyl carbonate.

Generally speaking, the best performance of all the cyclic sulfites under various conditions and formulations was seen with 1,3-propylene sulfite, followed by 1,2-propylene glycol sulfite, and then ethylene sulfite. The best performance of all the cyclic sulfones under various conditions and formulations was seen with butadiene sulfone, followed by sulfolane and then 3-methyl sulfolane.

In FIG. 1, the tested solvents are 1,2-propyleneglycol sulfite, 1,3-propylene sulfite, diethyl sulfite, dimethyl sulfite, 3-methyl sulfolane, butadiene sulfone, ethyl methyl sulfone, and sulfolane. Each was formulated at a 1:3 volume ratio with ethyl methyl carbonate. The control formulation, represented by a dotted line, uses ethylene carbonate (EC) as the high dielectric constant solvent and ethyl methyl carbonate (EMC) as the low viscosity solvent. In the control formulation, the ratio of HD:LV is 1:2 by volume with no additive. All formulations contained 1M LiPF$_6$ and either 0.5% or 2.0% by weight fluorinated ethylene carbonate (FEC) as an additive.

For both the sulfites and sulfones, the cyclic structures performed better than the linear structures. Specifically, 1,2-propyleneglycol sulfite, 1,3-propylene sulfite, 3-methyl sulfolane, butadiene sulfone, and sulfolane performed at levels near the control. Generally, these solvents performed the same or better with 2.0 weight percent fluorinated ethylene carbonate as compared to 0.5 weight percent fluorinated ethylene carbonate.

Table 3 demonstrates that further improvements can be obtained for certain embodiments of the electrolyte formulations disclosed herein when combined with a particular choice of low viscosity solvent and particular salts. Specifically, electrolyte formulations containing cyclic sulfone or cyclic sulfite solvents in place of ethylene carbonate as the high dielectric constant solvent are further optimized by varying the low viscosity solvent, SEI additives, or salts.

TABLE 3

1st cycle capacity, 1st cycle coulombic efficiency and 100th cycle capacity retention for certain solvent/salt formulations

| HD Solvent | LV Solvent | Salt | 1st Cycle Capacity (mAh/g) | 1st Cycle CE (%) | Capacity Retention (Cycle 100, %) |
|---|---|---|---|---|---|
| EC | EMC | LiPF$_6$ | 131.5 | 82.3 | 83.4 |
| Sulfolane | EMC | LiPF$_6$ | 133.5 | 81.0 | 86.9 |
| Sulfolane | EMC | LiBOB | 132.4 | 80.3 | 81.7 |
| Sulfolane | MA | LiPF$_6$ | 123.0 | 71.3 | 72.6 |
| Sulfolane | MA | LiBOB | 128.4 | 76.0 | 91.8 |

Table 3 demonstrates that the combination of sulfolane as the high dielectric solvent, methyl acetate as the low viscosity solvent, and LIBOB as the salt improves the capacity retention significantly as compared to other combinations. Table 3 shows that it is not simply the addition of one component, but rather the combination of components, that yields this improved performance. That is, the cyclic sulfone is not the only reason for the increase in performance in these silicon anode cells. The sulfolane provides improvement and the low viscosity solvent and salt pairing further improves the performance.

Figure 2:
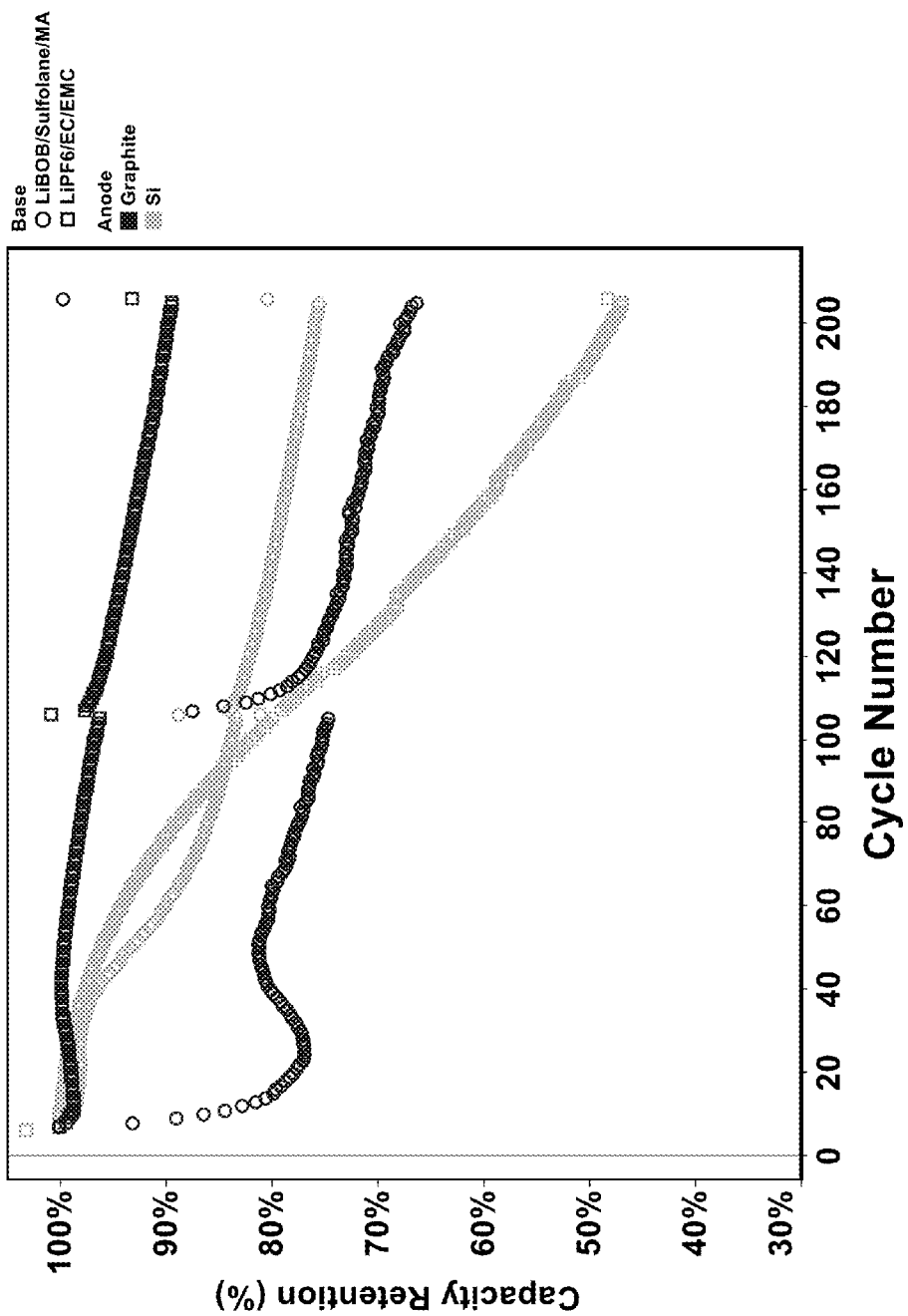
FIG. 2 illustrates electrochemical characterization of cells containing silicon anodes and graphite anodes, each having electrolyte formulations according to certain embodiments of the invention.

Moreover, the improved performance of the electrolyte formulation formed from the combination of sulfolane as the high dielectric solvent, methyl acetate as the low viscosity solvent, and LiBOB as the salt is specific to electrochemical cells with a silicon anode. FIG. 2 illustrates electrochemical characterization of cells containing silicon anodes and graphite anodes, each having electrolyte formulations according to certain embodiments of the invention. FIG. 2 shows that an electrolyte formulation having sulfolane as the high dielectric solvent, methyl acetate as the low viscosity solvent, and LiBOB as the salt improves cycle life as compared to a conventional electrolyte formulation having ethylene carbonate as the high dielectric solvent, ethyl methyl carbonate as the low viscosity solvent, and LiPF$_6$ as the salt. However, the performance of a cell having a graphite anode is the opposite, where the conventional electrolyte formulation performs better than the electrolyte formulation having sulfolane as the high dielectric solvent, methyl acetate as the low viscosity solvent, and LiBOB as the salt. Indeed, most of the electrolyte formulations disclosed herein do not have any particular benefit when used for pure graphite based cells, suggesting the uniqueness of these solvents for silicon anodes.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. An electrochemical cell comprising:
   a silicon alloy anode,
   a cathode, and
   an electrolyte solution comprising solvents having a cyclic sulfone or cyclic sulfite chemical structure.

2. The electrochemical cell of claim 1 wherein the electrolyte solution further comprises a low viscosity solvent.

3. The electrochemical cell of claim 2 wherein the low viscosity solvent is selected from the group consisting of diethyl carbonate, methyl butyrate, methyl acetate, methyl propionate, isobutyl acetate, methyl trimethyl acetate, and methyl isovalerate.

4. The electrochemical cell of claim 3 wherein the electrolyte solution does not include ethylene carbonate.

5. The electrochemical cell of claim 1 wherein the electrolyte solution further comprises at least one linear carbonate solvent.

6. The electrochemical cell of claim 5 wherein the electrolyte solution comprises fluorinated ethylene carbonate.

7. The electrochemical cell of claim 1 wherein the electrolyte solution comprises butadiene sulfone; sulfolane; 3-methyl sulfolane; ethylene sulfite; 1,3-propylene sulfite; 1,2-propylene glycol sulfite; or combinations thereof.

8. An electrochemical cell comprising:
   a silicon alloy anode;
   a cathode; and
   an electrolyte solution comprising a blend of 1,3-propylene sulfite and a low viscosity solvent selected from the group consisting of diethyl carbonate, methyl butyrate, methyl acetate, methyl propionate, isobutyl acetate, methyl trimethyl acetate, methyl isovalerate, ethyl methyl carbonate, dimethyl carbonate, and dipropyl carbonate.

9. The electrochemical cell of claim 8 wherein the electrolyte solution comprises a blend of 1,3-propylene sulfite and dimethyl carbonate.

10. The electrochemical cell of claim 8 wherein the electrolyte solution comprises a blend of 1,3-propylene sulfite and ethyl methyl carbonate.

11. The electrochemical cell of claim 8 wherein the electrolyte solution comprises a blend of 1,3-propylene sulfite and methyl butyrate.

12. The electrochemical cell of claim 8 wherein the electrolyte solution comprises a blend of 1,3-propylene sulfite and diethyl carbonate.

13. The electrochemical cell of claim 8 wherein the electrolyte solution comprises a blend of 1,3-propylene sulfite and methyl acetate.

14. The electrochemical cell of claim 8 wherein the electrolyte solution comprises a blend of 1,3-propylene sulfite and methyl propionate.

15. The electrochemical cell of claim 8 wherein the electrolyte solution comprises a blend of 1,3-propylene sulfite and isobutyl acetate.

16. The electrochemical cell of claim 8 wherein the electrolyte solution comprises a blend of 1,3-propylene sulfite and methyl trimethyl acetate.

17. The electrochemical cell of claim 8 wherein the electrolyte solution comprises a blend of 1,3-propylene sulfite and methyl isovalerate.

18. The electrochemical cell of claim 8 wherein the electrolyte solution comprises a blend of 1,3-propylene sulfite and dipropyl carbonate.

19. An electrochemical cell comprising:
   a silicon alloy anode;
   a cathode; and
   an electrolyte solution comprising a blend of butadiene sulfone and a low viscosity solvent selected from the group consisting of diethyl carbonate, methyl butyrate, methyl acetate, methyl propionate, isobutyl acetate, methyl trimethyl acetate, methyl isovalerate, ethyl methyl carbonate, dimethyl carbonate, and dipropyl carbonate.

20. The electrochemical cell of claim 19 wherein the electrolyte solution comprises a blend of butadiene sulfone and dimethyl carbonate.

21. The electrochemical cell of claim 19 wherein the electrolyte solution comprises a blend of butadiene sulfone and ethyl methyl carbonate.

22. The electrochemical cell of claim 19 wherein the electrolyte solution comprises a blend of butadiene sulfone and diethyl carbonate.

23. The electrochemical cell of claim 19 wherein the electrolyte solution comprises a blend of butadiene sulfone and methyl butyrate.

24. The electrochemical cell of claim 19 wherein the electrolyte solution comprises a blend of butadiene sulfone and methyl acetate.

25. The electrochemical cell of claim 19 wherein the electrolyte solution comprises a blend of butadiene sulfone and methyl propionate.

26. The electrochemical cell of claim 19 wherein the electrolyte solution comprises a blend of butadiene sulfone and isobutyl acetate.

27. The electrochemical cell of claim 19 wherein the electrolyte solution comprises a blend of butadiene sulfone and methyl trimethyl acetate.

28. The electrochemical cell of claim 19 wherein the electrolyte solution comprises a blend of butadiene sulfone and methyl isovalerate.

29. The electrochemical cell of claim 19 wherein the electrolyte solution comprises a blend of butadiene sulfone and dipropyl carbonate.

30. An electrochemical cell comprising:
   a silicon alloy anode;
   a cathode; and
   an electrolyte solution comprising a blend of sulfolane and a low viscosity solvent selected from the group consisting of diethyl carbonate, methyl butyrate, methyl acetate, methyl propionate, isobutyl acetate, methyl trimethyl acetate, methyl isovalerate, ethyl methyl carbonate, dimethyl carbonate, and dipropyl carbonate.

31. The electrochemical cell of claim 30 wherein the electrolyte solution comprises a blend of sulfolane and methyl acetate.

32. The electrochemical cell of claim 31 further comprising lithium bis(oxalato)borate.

33. The electrochemical cell of claim 30 wherein the electrolyte solution comprises a blend of sulfolane and ethyl methyl carbonate.

34. The electrochemical cell of claim 30 wherein the electrolyte solution comprises a blend of sulfolane and diethyl carbonate.

35. The electrochemical cell of claim 30 wherein the electrolyte solution comprises a blend of sulfolane and methyl butyrate.

36. The electrochemical cell of claim 30 wherein the electrolyte solution comprises a blend of sulfolane and methyl propionate.

37. The electrochemical cell of claim 30 wherein the electrolyte solution comprises a blend of sulfolane and isobutyl acetate.

38. The electrochemical cell of claim 30 wherein the electrolyte solution comprises a blend of sulfolane and methyl trimethyl acetate.

39. The electrochemical cell of claim 30 wherein the electrolyte solution comprises a blend of sulfolane and methyl isovalerate.

40. The electrochemical cell of claim 30 wherein the electrolyte solution comprises a blend of sulfolane and dimethyl carbonate.

41. The electrochemical cell of claim 30 wherein the electrolyte solution comprises a blend of sulfolane and dipropyl carbonate.

* * * * *